United States Patent
Dalal et al.

(10) Patent No.: US 10,580,057 B2
(45) Date of Patent: *Mar. 3, 2020

(54) PHOTOREALISTIC RECOMMENDATION OF CLOTHING AND APPAREL BASED ON DETECTED WEB BROWSER INPUT AND CONTENT TAG ANALYSIS

(71) Applicant: Google LLC, Mountain View, CA (US)

(72) Inventors: Navneet Dalal, Bangalore (IN); Salih Burak Gokturk, Mountain View, CA (US); Lorant Szasz-Toth, San Francisco, CA (US); Munjal Shah, Los Altos Hills, CA (US)

(73) Assignee: Google LLC, Mountain View, CA (US)

( * ) Notice: Subject to any disclaimer, the term of this patent is extended or adjusted under 35 U.S.C. 154(b) by 334 days.

This patent is subject to a terminal disclaimer.

(21) Appl. No.: 15/583,820

(22) Filed: May 1, 2017

(65) Prior Publication Data

US 2017/0236185 A1 Aug. 17, 2017

Related U.S. Application Data

(62) Division of application No. 12/972,388, filed on Dec. 17, 2010, now Pat. No. 9,639,880.

(60) Provisional application No. 61/287,703, filed on Dec. 17, 2009.

(51) Int. Cl.
*G06Q 30/00* (2012.01)
*G06Q 30/06* (2012.01)
*G06K 9/00* (2006.01)
*G06K 9/62* (2006.01)

(52) U.S. Cl.
CPC ..... *G06Q 30/0631* (2013.01); *G06Q 30/0623* (2013.01); *G06Q 30/0641* (2013.01); *G06Q 30/0643* (2013.01); *G06K 9/00362* (2013.01); *G06K 9/6267* (2013.01); *G06K 2209/19* (2013.01)

(58) Field of Classification Search
CPC ..... G06Q 30/0251–0277; G06Q 30/06; G06Q 30/0601–0643; G06Q 30/08
See application file for complete search history.

(56) References Cited

U.S. PATENT DOCUMENTS

| | | |
|---|---|---|
| 2001/0049623 A1 | 12/2001 | Aggarwal et al. |
| 2003/0065578 A1 | 4/2003 | Peyrelevade et al. |
| 2006/0020482 A1 | 1/2006 | Coulter |
| 2007/0043582 A1 | 2/2007 | Peveto et al. |
| 2007/0150368 A1 | 6/2007 | Arora et al. |

(Continued)

OTHER PUBLICATIONS

Chromatics Color Sciences International Signs Lease and License Agreement with Nordstrom Department Stores PR Newswire [New York] Sep. 4, 1998:1.

(Continued)

*Primary Examiner* — William J Allen
(74) *Attorney, Agent, or Firm* — Dority & Manning, P.A.

(57) ABSTRACT

A system and method for recommending clothing or apparel to a user. Activity of a user is detected in order to identify a set of items that are of interest to the user. One or more recommendation parameters may be determined for the used based at least in part on the individual items of clothing/apparel that are of interest to the user. Clothing/apparel content is selected for display to the user based on the recommendation parameters.

18 Claims, 4 Drawing Sheets

(56) References Cited

U.S. PATENT DOCUMENTS

| | | |
|---|---|---|
| 2007/0179916 A1 | 8/2007 | Wan et al. |
| 2008/0097975 A1 | 4/2008 | Guay et al. |
| 2008/0144943 A1* | 6/2008 | Gokturk .............. G06K 9/46 382/224 |
| 2008/0177641 A1 | 7/2008 | Herniak et al. |
| 2008/0270398 A1 | 10/2008 | Landau et al. |
| 2009/0019053 A1* | 1/2009 | Burgess .............. G06Q 30/02 |
| 2009/0043665 A1 | 2/2009 | Tirumalareddy et al. |
| 2009/0172730 A1* | 7/2009 | Schiff .............. G06Q 30/02 725/34 |
| 2010/0030663 A1 | 2/2010 | Wannier et al. |
| 2010/0094729 A1 | 4/2010 | Gray et al. |
| 2010/0191578 A1 | 7/2010 | Tran et al. |
| 2010/0191770 A1 | 7/2010 | Cho et al. |
| 2011/0072132 A1 | 3/2011 | Shafer et al. |
| 2011/0082764 A1 | 4/2011 | Flusser et al. |
| 2011/0184832 A1 | 7/2011 | Wannier et al. |

OTHER PUBLICATIONS www.avon.com. Feb. 17, 2008 (Feb. 17, 2008) [recovered from www.Archive.org].

Gruber, "Collective Knowledge Systems: Where the Social Web meets the Semantic Web," Web Semantics: Science, Services and Agents on the World Wide Web, 6(1):4-13, Feb. 2008.

Mooney and Roy, "ContentBased Book Recommending Using Learning for Text Categorization," Proceedings of the Fifth ACM Conference on Digital Libraries, pp. 195-240, Jun. 2000.

Schafer et al. "E-Commerce Recommendation Applications," Data Mining and Knowledge Discovery, 5(1-2):115-153, Jan.-Apr. 2001.

Snow et al., "Semantic Taxonomy Induction from Heterogenous Evidence," Proceedings of the 21st International Conference on Computational Linguistics and $44^{th}$ Annual Meeting of the ACL, Jul. 2006, pp. 801-808.

Ziegler et al., "Improving Recommendation Lists Through Topic Diversification," WWW '05 Proceedings of the 14th international conference on World Wide Web, May 2005, pp. 22-32.

* cited by examiner

PHOTOREALISTIC RECOMMENDATION OF CLOTHING AND APPAREL BASED ON DETECTED WEB BROWSER INPUT AND CONTENT TAG ANALYSIS

RELATED APPLICATIONS

This application is a division of U.S. patent application Ser. No. 12/972,388, filed Dec. 17, 2010, which claims benefit of priority to Provisional U.S. Patent Application No. 61/287,703, filed Dec. 17, 2009; the aforementioned applications being hereby incorporated by reference in their entirety.

TECHNICAL FIELD

The described embodiments pertain generally to a recommendation engine for clothing and apparel.

DETAILED DESCRIPTION

Figure 1:
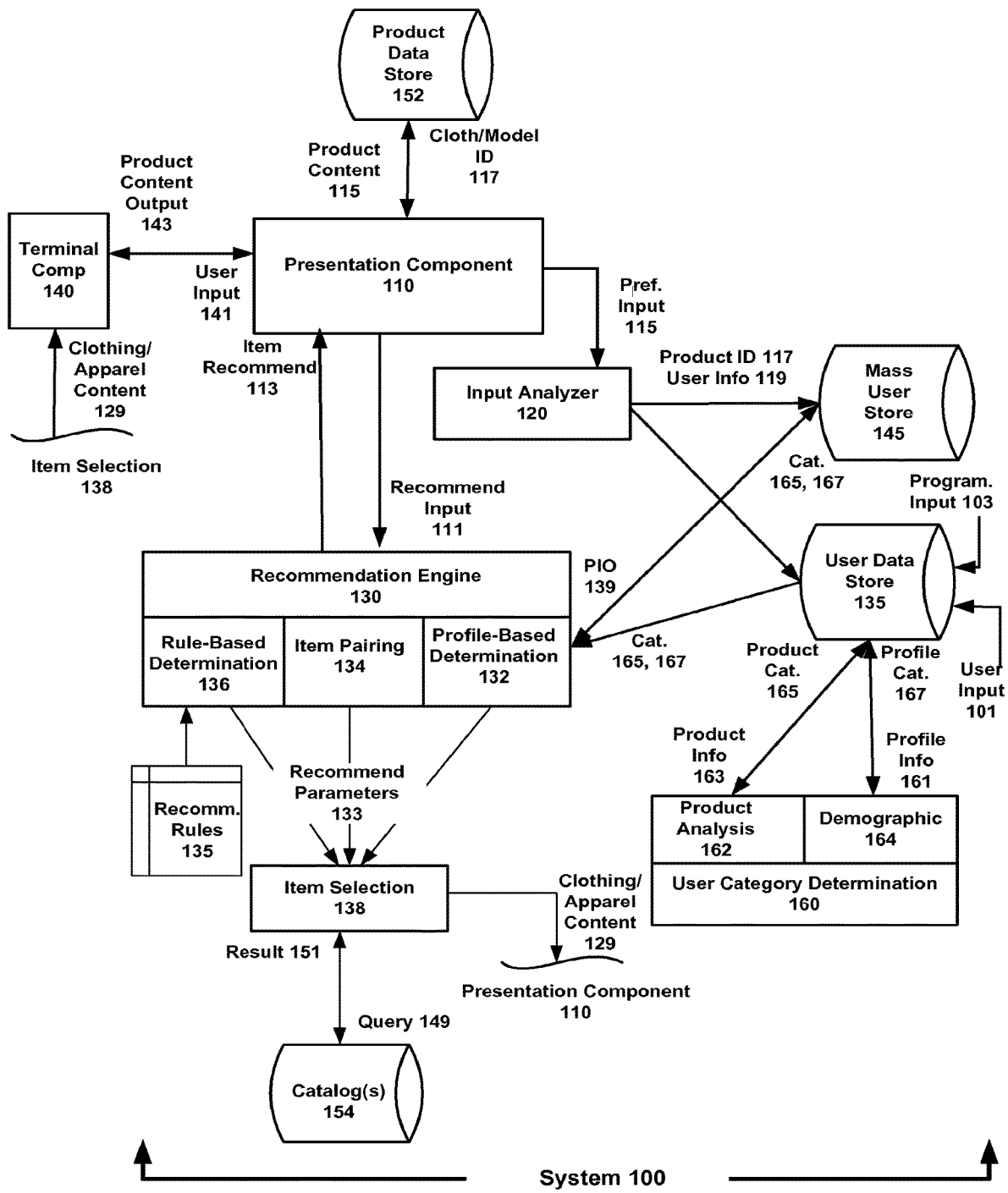
FIG. 1 illustrates a system for recommending clothes or apparel to a person, according to one or more embodiments.

Embodiments described herein include a system and method for recommending clothing or apparel to a user. A user's inputs (e.g. activity) relating to clothing and apparel can be used to identify a set of items that are of interest to the user. One or more recommendation parameters may be determined for the used based at least in part on the individual items of clothing/apparel that are of interest to the user. Clothing or apparel content is selected for display to the user based on the recommendation parameters.

The clothing/apparel content that is selected for the user may include commercial content that enables the user to, for example, purchase the displayed item(s).

As used herein, the terms "programmatic", "programmatically" or variations thereof mean through execution of code, programming or other logic. A programmatic action may be performed with software, firmware or hardware, and generally without user-intervention, albeit not necessarily automatically, as the action may be manually triggered.

One or more embodiments described herein may be implemented using programmatic elements, often referred to as modules or components, although other names may be used. Such programmatic elements may include a program, a subroutine, a portion of a program, or a software component or a hardware component capable of performing one or more stated tasks or functions. As used herein, a module or component, can exist on a hardware component independently of other modules/components or a module/component can be a shared element or process of other modules/components, programs or machines. A module or component may reside on one machine, such as on a client or on a server, or a module/component may be distributed amongst multiple machines, such as on multiple clients or server machines. Any system described may be implemented in whole or in part on a server, or as part of a network service. Alternatively, a system such as described herein may be implemented on a local computer or terminal, in whole or in part. In either case, implementation of system provided for in this application may require use of memory, processors and network resources (including data ports, and signal lines (optical, electrical etc.), unless stated otherwise.

Embodiments described herein generally require the use of computers, including processing and memory resources. For example, systems described herein may be implemented on a server or network service. Such servers may connect and be used by users over networks such as the Internet, or by a combination of networks, such as cellular networks and the Internet. Alternatively, one or more embodiments described herein may be implemented locally, in whole or in part, on computing machines such as desktops, cellular phones, personal digital assistances or laptop computers. Thus, memory, processing and network resources may all be used in connection with the establishment, use or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

System

FIG. 1 illustrates a system for recommending clothes or apparel to a person, according to one or more embodiments. A system 100 may be implemented on a computing environment such as described with FIG. 5. In some implementations, a system of FIG. 1 is provided on one or more servers that provide the functionality of the system through a website or web interface. A user may operate a terminal to access functionality provided by system 100 over a network such as the Internet. The user terminal may correspond to a personal computer, laptop, tablet, or mobile computing device that is network connected. The terminal may operate applications such as a web browser or a web-enabled application, in order to access the functionality provided by system 100. Alternative embodiments provide for system 100 to be implemented on user terminals, or distributed between user terminal and server.

According to one or more embodiments, the system 100 includes a presentation component 110, an input analyzer 120, and a recommendation engine 130. The presentation component 110 communicates with a terminal component 140, such as a browser or application, in order to enable the user to interact with the system 100. According to some embodiments, the system 100 is implemented for a website that users can access over the Internet.

The presentation component 110 renders items of clothing in any one of many possible ways. For example, in some embodiments, the images of the items of clothing are rendered as a series of panels, or as a gallery. In other embodiments, the images may show the items of clothing individually or as an ensemble. In particular, the presentation component 110 may display content items that depict clothing and apparel. Such content items include, for example, catalog records from vendors and manufacturers of clothing and apparel. Such records typically include text and image portions that described a particular item of clothing or apparel. Other forms of content that can be rendered through the presentation component 110 include noncommercial content, such as social network content or biogs, in which persons (friends, celebrities, etc.) are depicted as wearing particular items of clothing or apparel. Still further, the presentation component 110 may display the clothing as part of an interactive photorealistic imaging system, in which an item of clothing is presented in a manner to reflect how the clothing would appear when worn on a person and/or in combination with other clothing.

For situations in which embodiments discussed here collect personal information about users, the users may be provided with an opportunity to opt in/out of programs or features that may detect and/or collect personal information (e.g., user profile information, such as information about a user's preferences, items purchased, demographic information etc.). In addition, certain data may be anonymized in one or more ways before it is stored or used, so that personally identifiable information is removed. For example, a user's identity may be anonymized so that the no personally identifiable information can be determined for the user and so that any identified user preferences or user interactions are generalized (for example, generalized based on user demographics) rather than associated with a particular user.

According to an embodiment, the input analyzer 120 detects and/or analyzes the interaction of the user with the presentation component 110. The input analyzer 120 is configured to detect various forms of input provided by the user in response to the content displayed via the presentation component 110. The input analyzer 120 may designate certain kinds of input (preference inputs 115) to be indicative of a particular user's interest in an item of clothing or apparel. Depending on design parameters implemented with the input analyzer 120, the preference inputs 115 may include, for example, (i) actions by which the user elects to view a specific item of clothing or apparel in more detail (when, for example, multiple items are available for the user selection), (ii) actions by which a user navigates or elects to see a source for catalog record of the particular item of clothing or apparel, (iii) input, in which the user expressly state his or her interest in the item of clothing or apparel (e.g. rating input, or input to indicate like or dislike), (iv) search terms that are specific to a particular clothing or apparel, and (v) items of clothing or apparel that the user purchased, either presently or in the past (e.g. by inspection of a user account with a merchant). In addition, some embodiments extend to a photorealistic interface, in which images of clothing and apparel selected by the user are displayed in a realistic and worn manner. Examples of photorealistic displays of clothing include displaying clothes and apparel to appear as (i) hanging in a worn state, (ii) off an object, or (iii) simulated as being worn on a virtual mannequin or human-like model.

The system 100 may store information determined from preference inputs and other user activity, such as product identifiers 117 for clothing that is liked or preferred by the user. Other information about the user, such as a user's demographic or preference profile, can also be stored by the system 100. Some user information is stored in a mass user data store 145. For example, a user's identity may be anonymized so that the no personally identifiable information can be determined for the user and so that any identified user preferences or user interactions are generalized (for example, generalized based on user demographics or product preferences) rather than associated with a particular user. Thus, information stored in the mass user data store may be anonymized. Additionally, the user may have the opportunity to opt-in/out of having such information stored or otherwise collected. The system 100 uses the mass user data store 145 as a basis for generating recommendations to users in a population, as well as for analysis (e.g. trend spotting, determining globally popular colors etc.). The user information stored in the mass user data store 145 can exclude information that identifies the user by specific demographics or is associated with a specific user, in order to protect privacy. Thus, the mass user data store 145 may associate the user's activities and preferences (including purchases and items of interest) with the user using non-identifiable information, such as computer generated identifiers.

Additionally, some user specific information can be stored in a user data store 135. While this information may be associated with the user, it may also be anonymized. Moreover, the user may have the opportunity to opt-in/out of having such information stored or otherwise collected. The user specific information may also include specific demographic or profile information. This information may identify, for example, products that the user is interested in, as well as other information, such as information that indicates the user's need or preference for a particular type or category of clothing.

Some of the user specific information may be recorded manually, such as from user input 101. For example, the user may be asked to fill out a series of questions about themselves. Alternatively, the user may be provided challenges or prompts that determine the user's taste or likes/dislikes for particular objects or features, including those related to clothing and apparel. As an alternative or addition to user input 101, the user data store information may be programmatically determined (programmatic input 103) by the input analyzer 120. The programmatic input 103 may be generated by detecting and analyzing historical data relating to a user, such as purchases.

A user category determination sub-system 160 identifies category assignments for the user. The user category determination subsystem 160 includes a demographic component 164 that associate one or more profile categories 167 to the user based on corresponding profile information 161 that can be retrieved from the user data store 135. For example, the demographic categorization component 164 may analyze recent or historical purchases of the user.

In addition to demographic categorization, the product analysis component 162 categorizes the user's preference for clothing and apparel based on various factors such as clothing/apparel characteristics of items that the user purchased, viewed or otherwise indicated were of interest. In one embodiment, the product analysis component 162 analyzes product information 163, corresponding to product identifiers stored in the user's profile as being of interest. The product information may be recorded by the input analyzer 120. The product information associated with the user profile can be analyzed to identify specific items of clothing or apparel (e.g. by product identifier) that are of the user's interest, in order to identify characteristics of those items of clothing and apparel. The characteristics include visual features, such as color, patters, texture, shape and style. The characteristics can also include non-visual characteristics, such as popularity of the items or brand information. In determining category assignments for the user based on product information, the product analysis component 162 may include, or utilize resources for determining visual and other characteristics of products specified by the product information 163. These resources include content analysis systems, including image recognition or processing and text analysis, which can analyze clothing/apparel content (e.g. catalog records).

Additionally, in some embodiments, the analysis performed to identify visual and/or other characteristics is performed separate and apart from operations of system 100. For example, the characteristics of the clothing and apparel that the user views in a particular context may be predetermined. Once information is known about what items of clothing or apparel are of interest to the user, the identified items may be cross-referenced with the database that stores information about the visual features of those items.

Thus, the category determination sub-system 160 may process the user's profile information to determine categories associated with the user. The category assignments may be derived from both profile and product information. The category assignments may associate the user with, for example, categories such as color (corresponding to favorite colors for clothing), style preferences, brand preferences, pattern and texture preferences, and designer or brand (affinity of the user for a particular designer or brand).

The recommendation engine 130 includes components and logic to identify clothing and apparel content that is likely to be appreciated by the user. The clothing and apparel content can correspond to catalog records, for example, which include image and text describing products that can be purchased, along with links to enable the user to purchase such products. In this context, the recommendation engine 130 generates one or more recommendations to the user for clothing and apparel items that user may be interested to view or purchase. In one embodiment, the user makes a request from a programmatic component running on a website for a recommendation to clothing or apparel. The recommendation engine 130 implements logic to make the recommendation(s) for the user.

The recommendations generated by the recommendation engine 130 may be based on (i) a categorization associated with the user, based on demographic or product information known about the user; (ii) recommendation rules, as determined by experts such as fashion designers; or (iii) recommendations based on a user's current selection, as determined from what other users have matched or used with the current selection. In this regard, the recommendation engine 130 may utilize either historical information associated with the user (e.g. information relating to user's preferences, past purchases etc.), or utilize information determined during a current user session, independent or without regard to information determined about the user.

According to an embodiment, the recommendation engine 130 includes parameter determination 132, item pairing 134 and rule-based determination 136. In an embodiment (or mode of operation), the parameter determination 132 operates using known or historical information obtained from the user over, for example, multiple user online sessions and past user input. Accordingly, the parameter determination 132 identifies recommendation parameters 133 for the user. The recommendation parameters 133 may be determined from, or correspond to categorizations associated with a particular user. The categorizations may include one or more product categories 165 and profile categories 167. For example, the product categories 165 may include one or more of (i) preferred colors, patterns, or textures; (ii) style and shape of clothing/apparel; (iii) brand preferences. The profile categories 167 may include information relating to the type of clothing the user needs or would prefer. The categorizations of the user may form a basis for recommendation parameters 133.

In one embodiment, the mass user store 145 is used to identify other users that have similar categorizations, or alternatively similar categories of interest. The product determination 132 uses the mass data store 145 to determine products of interest of others ("PIO") 139, corresponding items of clothing or apparel that are purchased or otherwise deemed of interest to users with similar categorizations may be identified. To determine PIO 139, the recommendation engine 130 queries the mass data store 145 for information identified from others who have the same or similar categorizations 165, 167. For example, the query may structure a super set category that overlaps multiple categorizations 165, 167 of the user (e.g. interests AND favorite color).

The recommendation parameters 133 may identify products by identifier, class or criteria. In one embodiment, the recommendation parameters correspond to product identifiers for items of clothing or apparel that are likely of interest to the user, as determined from products of interest of others 139. As an alternative to receiving specific product information, the mass user store may return product characteristics, such as specific style and/or color information that characterizes products of interest by those deemed similar or having similar category assignments. The recommendation parameter 133 may correspond to a criterion that specifies specific products (e.g. PIO 139), categories, or category supersets, as based from, for example, the mass data store 145. In this way, the recommendation parameters 133 may be used to structure queries for use on, for example, a content data base or product catalog 154.

Still further, the recommendation parameters 133 may identify visual characteristics of clothing or apparel as determined from the user's profile information, stored in the user data store 135. For example, the product categorization 165 may identify the user's favorite colors and style. The category (or category superset) can be queries against the catalog 154 to determine specific items for recommendation 131.

In another embodiment (or alternative mode of operation), the recommendation engine 130 may be session-based, in that historical or presession information about the user is not used to make a recommendation. The item pairing 134 may identify current items that the user has selected. The item pairing 134 may cross-reference the item selected with a recommended set of items that is pre-established. Alternatively, the item pairing 134 may use the mass user store 145 to identify what other users have paired with the item currently under selection by the user. The item pairing 134 then identifies recommendation parameters 133 based on these determinations. The recommendation parameters 133 may identify specific items of clothing or apparel, or alternatively, identify characteristics or categories (e.g. particular style and color) that match well (e.g. based on what other users have selected) to the specific item of the user's selection.

Still further, the item pairing may extract or determine one or more characteristics (e.g. visual features) of the item that is under user selection. The item pairing may access mass user store 145 to determine what others user's have recently paired with other items having similar characteristics or visual features. Thus, the item pairing 134 can operate on input that corresponds to a specific item, or to input that identifies a category or characteristic of a product.

As an addition or alternative, the recommendation engine 130 may also used the rule-based determination. The rule based determination 136 incorporates a rule set 135 that can be created by, for example, fashion experts. The rule based determination 136 utilizes the rule set 130 to determine recommendations based on pre-established rules. For example, the rule set may pair wool pants from a particular manufacturer to a set of shirts that have colors and patterns that are deemed trendy or in style (as specified by human operators). The rule based determination 136 may generate recommendations, provide weights for selecting one item over another to recommend, or disqualify recommendations that would otherwise have been made.

One or more of the components of the recommendation engine 130 communicate recommendation parameters 133 to an item selection logic 138. In one embodiment, item selection logic 138 formulates queries 149 to select a set of item recommendations for the user. For example, the item selection logic 138 may specify a particular item of clothing (as learned from mass user data store 145), or a particular product class. Results 151 of the queries 149 may optionally be filtered, processed or weighted in order to generate an output corresponding to clothing/apparel content 129. The clothing/apparel content 129 may include content, such as catalog records, that contain clothing or apparel that the user may find of interest. The clothing/apparel content 129 may be displayed to the user on the terminal component 120. For example, the clothing/apparel content 129 can include items that the user can select in order to initiate a transaction for the depicted item of clothing or apparel. Various other forms of content may also be displayed. For example, the recommended clothing/apparel content may be displayed as clothing that is displayed in worn state (e.g. worn on a simulated person or mannequin).

While numerous embodiments described herein provide for recommendations to be made to a given user, one or more embodiments may automate the generation of recommendations using techniques and processes described herein. For example, the recommendation engine 130 (FIG. 1) may recommend clothing and apparel on an ongoing basis, in response to specific activities that the user performs at a website. If the user selects a particular item for viewing, the recommendation engine may access the users profile information, mass-user data, and other sources in order to generate recommendations of other items in real-time and/or on an ongoing basis.

Alternatively, some embodiments provide that the user can select assistance in finding a pairing or complementary set of clothing for an item that is of initial interest to the user. For example, the user may initially be interested in the pair of pants, and may seek assistance in finding other clothes and match the pair. One or more embodiments include providing a user interface feature, such as a soft button or icon, that the user can select in order to generate recommendations from the recommendation engine 130.

Methodology

Figure 2:
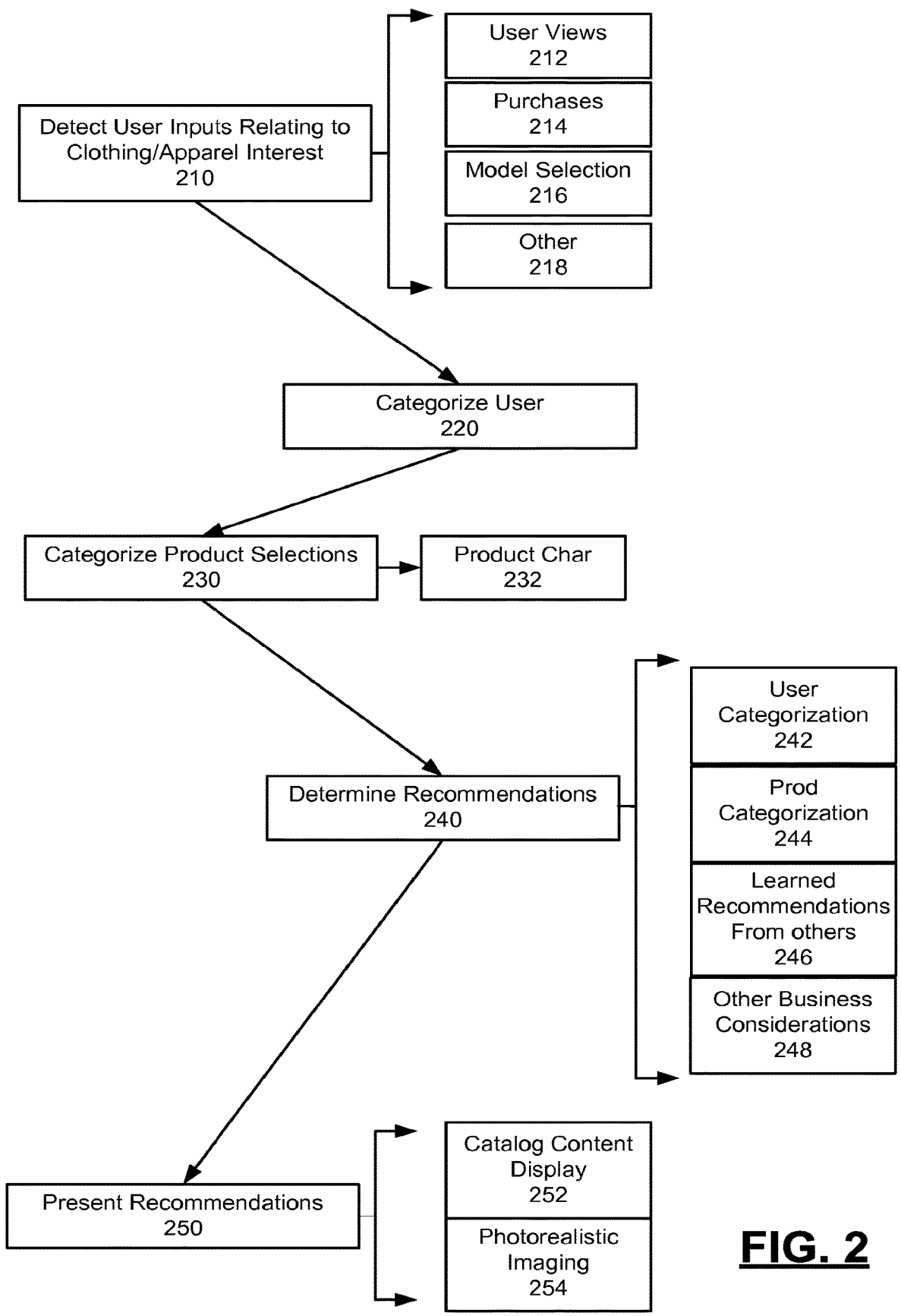
FIG. 2 illustrates a process for making recommendations to a user for items of clothing or apparel, under an embodiment.

FIG. 2 illustrates a process for making recommendations to a user for items of clothing or apparel, under an embodiment. In describing an embodiment of FIG. 2 (as well as FIGS. 3 and 4), reference is made to system 100 for purpose of identifying elements or components that are suitable for performing a step or sub-step being described.

In step 210, user selections or activity can be detected in order to determine their interest in clothing/apparel. In an implementation in which the system 100 is provided for a website, for example, the user activity at the website may be detected. The user's transactions can also be analyzed at, for example, the account of an e-commerce site, or through interface with a payment account (e.g. credit card). Specific examples of activity that can be detected include (i) what clothing or apparel the user views at the website, including what items the user searched for, what items the user selected to view etc.; (ii) history of items the user purchased (e.g. if the user purchased a lot of items from a particular manufacturer, then this information is indicative of what to recommend to the user); (iii) clothing selection for creating ensembles and clothing simulations; and (iv) other activities (e.g. manual information provided by the user about his tastes and preferences, information imported from other website or source). The users may be provided with an opportunity to opt in/out of programs or features that may collect personal information (e.g., information about a user's preferences or a user's contributions to social content providers). In addition, certain data may be anonymized in one or more ways before it is stored or used, so that personally identifiable information is removed. For example, a user's identity may be anonymized so that the no personally identifiable information can be determined for the user and so that any identified user preferences or user interactions are generalized (for example, generalized based on user demographics) rather than associated with a particular user.

With regard to clothing simulation, one or more embodiments include enabling a user to select clothing that is then simulated in a worn state. The simulation may include depicting the clothing as being hanged or worn on a virtual model or mannequin, with or without other items of clothing. In some implementations, photorealistic imaging may be used, incorporating computer-implemented processes that formulate clothing simulations from actual images of clothing and mannequins or models. In the context of photorealistic imaging of clothing, processes performed include (i) formulating a picture of a model or mannequin, and (ii) enabling users (operators on a computer) to select clothing and apparel for the model/mannequin to wear. Among considerations, the model may be imaged (at time of capture and/or post-capture) from a mannequin, to establish a standard in pose and dimension. Likewise, the selected clothing may be rendered on the model in a manner that (i) recreates what the clothing actually looks like, while (ii) simulating real-world effects of how the clothes appear when worn, when the pose or clothing environment (e.g. what other clothes are on the model) is taken into account.

In step 220, the user is categorized based in part on information determined from detecting the user activities and selections relating to clothing and apparel. For example, information retained in the user data store 135 may be used to categorize the user. Various categories may be assigned to the user to reflect the type of clothing the user would need or prefer. In one embodiment, the category association of the user may be represented as variables that include value and/or weights. Additionally, one or more of the categories may be inferred from profile data, such as identification of actual items purchased.

Additionally, the user categorization may be made to product selections of the user (230). As mentioned with an embodiment of FIG. 1, the user product categorizations may be based on product characteristics (232), including visual product characteristics. In this way, the user's interest for clothing and apparel having, for example, a particular color, texture, pattern, shape or style, brand or price range may be identified. The various product characteristics may be determined from programmatic analysis of content that depicts the clothing and apparel that the user is interested in. For example, the user may view images of clothing and apparel that include text and image content about the product. The text and image content may be analyzed using image recognition or processing, as well as text analysis. Alternatively, some of the product characteristics may be predetermined, through, for example, manual determination or content tags associated with the clothing/apparel content.

The recommendations are determined for the user (240) based in part on the categorizations associated with the user. The recommendations may be based at least in part on (i) the demographic user category assignments (242), (ii) the product categorizations for clothing/apparel of interest to the user (244), (iii) learned recommendations from products of interest to others having similar category assignments (246), and (iv) other business considerations (248).

Sub-step (246) provides for use of learned recommendations, particularly of users that have a common set of categories with the user at hand (e.g. preferences, taste). Other users may, for example, create ensembles or have a preference for a particular item. The detected data may be used to associate successful recommendations from other users to the particular user.

In one embodiment, the business considerations (sub-step 248) include, for example, sponsors who pay the operator of the system to have their items promoted over others. Such considerations may be reflected by weighting or superseding recommendations determined through category assignments. Additionally, weights may be used to accommodate or promote trends or perception of a particular brand, genre or specific item of clothing. Among other implementations, the business considerations may alter the weights in the categories. Business considerations may also be implemented to supersede a recommendation that would have otherwise been made through use of only categories.

In step 250, the recommendations are presented to the user. In one embodiment, recommendations may be made by presenting catalog content (252), having text and/or images that show and describe the clothing items that are being recommended to the user. The recommendations may be provided with links or other features that enable the user to purchase or search the recommended item.

As one variation, the recommendations may be made by way of photorealistic imaging (as described above) (254). The recommended items of clothing may, for example, be presented in a worn state (e.g. simulated on a virtual model) and shown with other items that comprise an ensemble (additional recommendations, determined from the recommended item). Other forms of presentation such as described may also be used.

According to an embodiment, the input detection process may also detect the actions of the user after the recommendation is made. For example, the user's interaction may signal strong liking of a recommendation (e.g. the user selects to make a purchase), a linking (the user views the recommendation, in the case of photorealistic rendering on the model, the user may create alternatives), or the user may show his dislike. The reaction to the recommendations may be observed to reweight the category parameters and/or tune or modify the algorithms from which recommendations are made to that user.

Figure 3:
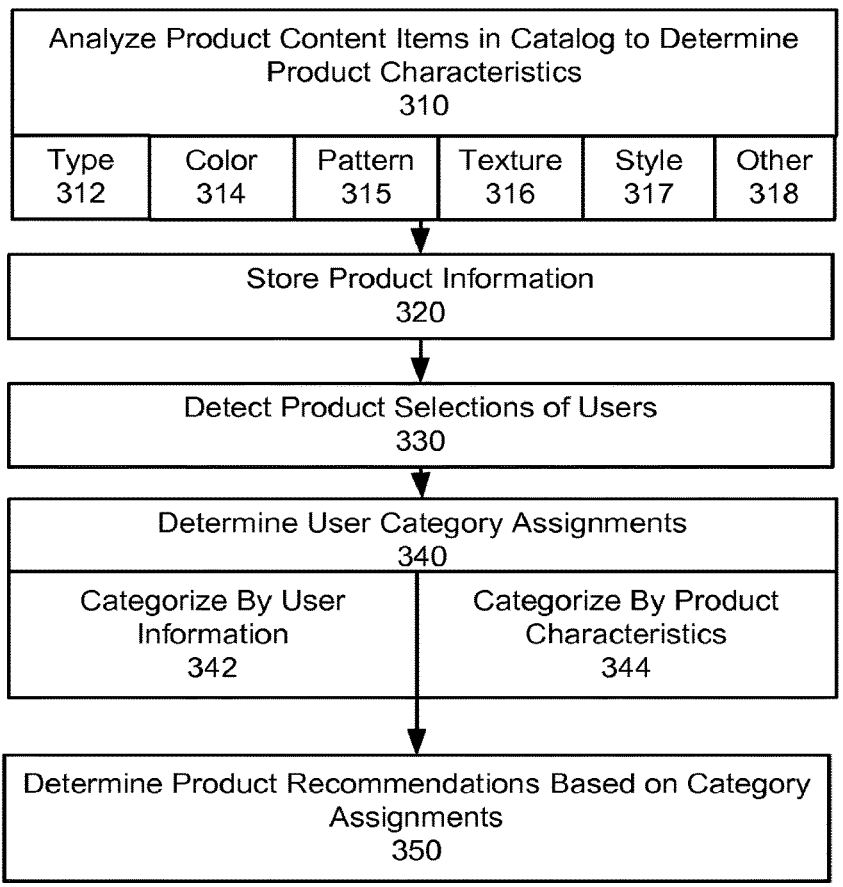
FIG. 3 illustrates a method for generating recommendations based on category assignments of the user, according to one or more embodiments.

FIG. 3 illustrates a method for generating recommendations based on category assignments of the user, according to one or more embodiments. Embodiments recognize that it can be implemented on a website for purpose of recommending clothing/apparel products that are promoted, or made available for sale, through the website. Such websites can display content from clothing and apparel catalogs, which include individual product records that carry text and image to describe an item of clothing or apparel. In such contexts, one or more embodiments provide that the clothing/apparel content may be programmatically analyzed to determine characteristics from which user categorizations may take place. For example, image recognition or analysis may be used in combination with text and made a data analysis in order to determine characteristics of clothing or apparel displayed in individual catalog records (or other content items). The characteristics that can be determined from such analysis include, for example, a clothing/apparel type (312), color (314), a pattern (e.g. Hawaiian shirt) (315), a texture (316), a style (317) or other characteristic (e.g. style, brand etc.) (318).

The product information, corresponding to determined categorizations of the clothing and apparel that is displayed by the content of the web service, is stored for subsequent use (320).

Subsequently, users of the web service interact with the clothing/apparel content. The web service may identify individual users and their interactions. Users may login or perform other acts at the website of the service to indicate their presence. The web service detects inputs and individual users activities. In one embodiment, the detected activity corresponds to product selections of the individual users (330). The product selections may correspond to acts of the user that include, for example, (i) the user selecting a particular record or content item by clicking on it (thereby opening a larger display containing more information and/or navigating to the merchant site where the product can be purchased); (ii) to user moving a particular item of clothing or apparel into a shopping basket; and/or (iii) the user purchasing the item of clothing or apparel. Various other activities may be detected as well. For example, the user may make inquiries about a specific item of clothing or apparel, which can then be recorded as being an item of interest. The user may also perform search operations in a search field of the site, enter feedback about a particular item (e.g. write a review or provide an endorsement), or select and e-mail a link to another person or store the link for personal use. When detected, these activities may be associated to a particular terminal. In some implementations, the various activities of the user may be weighted. For example, the users act towards purchasing an item may be weighted more heavily than the user's act of viewing an item.

Category assignments are then determined for the user (340). The category assignments may categorize the user by demographics (342), and/or byproduct characteristics (344). As mentioned with other embodiments, both types of categorizations may be determined from detecting inputs of the user. For example, a preferred color may be determined based on historical data or user input regarding clothing/apparel. Alternatively, demographic information may be determined from user input or other resources.

For an individual user, product recommendations are determined based at least in part on category assignments that are determined for that user. In one embodiment, a superset category is determined from different category assignments of the user. Other users with similar or same superset category assignments are identified, and products of interest for those users are identified as recommendations for the particular user. In other embodiments, one or more categories (or superset category) are used to identify other products from the catalog of the web service for presentation to the user. For example, the product characterization may identify that the user prefers a particular color and texture. Furthermore, the demographic information of the user may indicate that the user is affluent. Products that have the preferred color, texture and expense attribute (e.g. expensive brand or costs) may be selected as recommendations for the particular user.

Figure 4:
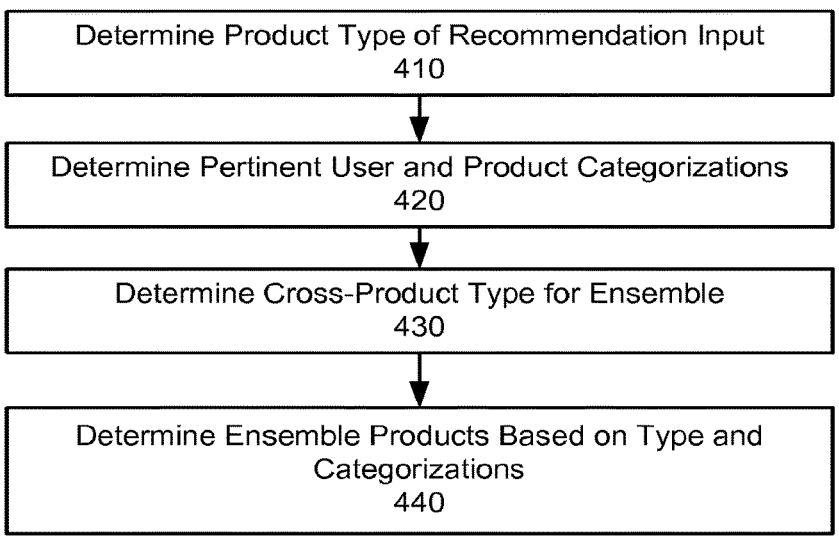
FIG. 4 illustrates a method for recommending items of clothing or apparel that complement a users selection and form an ensemble or outfit, according to an embodiment.

FIG. 4 illustrates a method for recommending items of clothing or apparel that complement a users selection and form an ensemble or outfit, according to an embodiment. In one embodiment, a user may select an item of clothing or apparel as an entry point for obtaining other recommendations, including recommendations for creating an ensemble that includes the particular item. The web service may include data or functionality for determining a type for products that are to be recommended, based on the user's initial selection (410). This includes identifying the product type of the item the user as initially selected. The category assignments of the user requesting the product recommendation may be determined (420). For example, the user's demographic categorization and/or product categorizations (e.g. preferred product characteristics) may be identified from, for example, an identifier associated with the terminal of the user requesting the recommendation.

The web service may include intelligence for identifying what other types of clothing are required to form an ensemble or outfit from the item the user has selected (430). For example, if the user has selected a pair of pants, the web service may clothes or accessories to complete an outfit based on the selected pants (e.g. blouses, scarfs, and jackets or vests). Additionally, jewelry, purses and/or belts may be identified as types of clothing/apparel that can be recommended.

Recommendations are then determined based on (i) types of clothing needed to fulfill an ensemble (or complement the user's initial selection), and (ii) generating recommendation parameters and criteria based on the category assignments (demographic and product) associated with the user. For example, if intelligence of the web service determines that the user has selected a pair of pants, the recommendation determination may seek to recommend other items that form an ensemble or pairing. In one embodiment, the web service automatically identifies clothing and/or apparel that is of a type that is complementary to the item of the user's initial selection. The specific item of the complementary type that is recommended may be selected based on criteria formulation that is based on the user's category assignments. Additionally, as mentioned with other embodiments, the particular items that are displayed to the user may be determined by identifying items of interest to other users who have similar category assignments.

Computer System

Figure 5:
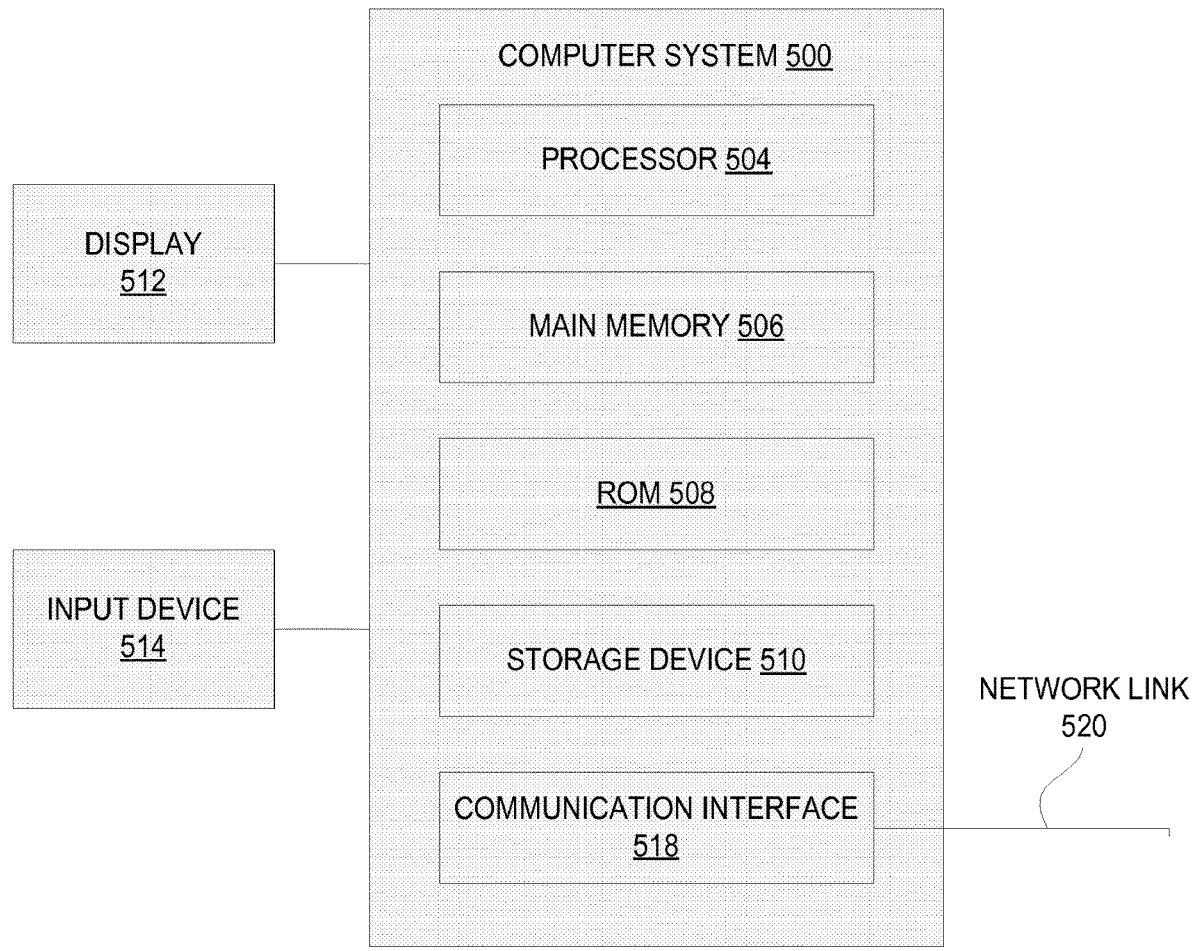
FIG. 5 is a block diagram that illustrates a computer system upon which an embodiments described herein may be implemented.

In an embodiment, one or more of a user's computer and server(s) (for implementing system 100 of FIG. 1) may be implemented on or using a computer system. FIG. 5 is a block diagram that illustrates a computer system 500 upon which embodiments described herein may be implemented. In an embodiment, computer system 500 includes processor 504, main memory 506, ROM 508, storage device 510, and communication interface 518. Computer system 500 includes at least one processor 504 for processing information. Computer system 500 also includes a main memory 506, such as a random access memory (RAM) or other dynamic storage device, for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device for storing static information and instructions for processor 504. A storage device 510, such as a magnetic disk or optical disk, is provided for storing information and instructions.

Computer system 400 may be coupled to a display 512, such as a cathode ray tube (CRT), a LCD monitor, and a television set, for displaying information to a user. An input device 514, including alphanumeric and other keys, is coupled to computer system 500 for communicating information and command selections to processor 504. Other non-limiting, illustrative examples of input device 514 include a mouse, a trackball, or cursor direction keys for communicating direction information and command selections to processor 504 and for controlling cursor movement on display 512. While only one input device 514 is depicted in FIG. 5, embodiments may include any number of input devices 514 coupled to computer system 500.

Embodiments described herein are related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement embodiments described herein. Thus, embodiments described are not limited to any specific combination of hardware circuitry and software.

CONCLUSION

Although illustrative embodiments have been described in detail herein with reference to the accompanying drawings, it is to be understood that the embodiments described are not limited to specific examples recited. As such, many modifications and variations are possible, including the matching of features described with one embodiment to another embodiment that makes no reference to such feature. Moreover, a particular feature described either individually or as part of an embodiment can be combined with other individually described features, or parts of other embodiments, even if the other features and embodiments make no mention of the particular feature.

What is claimed is:

1. A system for recommending clothing or apparel to a user, the system comprising:
   one or more processors that are configured to:
   monitor one or more digital content items that depict clothing or apparel to detect user inputs associated with presentation of the one or more digital content items in one or images by a terminal component for display;
   responsive to user input associated with the one or more digital content items:

analyze a content tag associated with the one or more images describing a first item of clothing or apparel displayed in the first image, wherein the content tag includes information identifying a plurality of visual characteristics of the first item of clothing or apparel;

determine one or more recommendation parameters for the user based at least in part on at least one of the plurality of visual characteristics and demographic information stored in a user profile associated with a user; and identify one or more additional items of clothing or apparel based at least in part on the one or more recommendation parameters; and provide for display by the terminal component one or more additional digital content items corresponding to the one or more additional items of clothing or apparel as a recommendation for the user, wherein the one or more additional items of clothing or apparel are rendered by the terminal component using a photorealistic interface that presents the one or more additional items of clothing or apparel in a manner that reflects how the one or more additional items of clothing or apparel would appear when worn on a person.

2. The system of claim 1, wherein the one or more processors identify the one or more additional items of clothing or apparel by (i) identifying other users that have interest in a product categorization that is of interest to the user, and (ii) determining what items of clothing or apparel were purchased or of interest to the other users.

3. The system of claim 2, wherein the one or more processors identify other users based on a categorization of the user corresponding to a taste or preference for the product categorization.

4. The system of claim 3, wherein the one or more processors determine the taste of the user by programmatically determining visual characteristics of items or clothing or apparel that are of interest to the user.

5. The system of claim 4, wherein the visual characteristics correspond to a color, a pattern, a texture or a style.

6. The system of claim 1, wherein monitoring the one or more digital content items includes analyzing text and image content of the digital content items.

7. The system of claim 1, wherein the one or more processors identify the one or more additional items of clothing or apparel based on a demographic user category, and recommendations to others having similar categories of interest.

8. A method comprising:
monitoring one or more digital content items that depict clothing or apparel to detect user inputs associated with presentation of the one or more digital content items in one or images by a terminal component for display;

responsive to user input associated with the one or more digital content items:

analyze a content tag associated with the one or more images describing a first item of clothing or apparel displayed in the first image, wherein the content tag includes information identifying a plurality of visual characteristics of the first item of clothing or apparel;

determine one or more recommendation parameters for the user based at least in part on at least one of the plurality of visual characteristics and user specific information stored in a user profile associated with a user; and identify one or more additional items of clothing or apparel based at least in part on the one or more recommendation parameters; and providing for display by the terminal component one or more additional digital content items corresponding to the one or more additional items of clothing or apparel as a recommendation for the user, wherein the one or more additional items of clothing or apparel are rendered by the terminal component using a photorealistic interface that presents the one or more additional items of clothing or apparel in a manner that reflects how the one or more additional items of clothing or apparel would appear when worn on a person.

9. The method of claim 8, wherein identifying the one or more additional items of clothing or apparel further comprises: (i) identifying other users that have interest in a product categorization that is of interest to the user, and (ii) determining what items of clothing or apparel were purchased or of interest to the other users.

10. The method of claim 9, wherein identifying other users is based on a categorization of the user corresponding to a taste or preference for the product categorization.

11. The method of claim 10, wherein determining the taste of the user includes programmatically determining visual characteristics of items or clothing or apparel that are of interest to the user.

12. The method of claim 11, wherein the visual characteristics correspond to a color, a pattern, a texture or a style.

13. The method of claim 8, wherein monitoring the one or more digital content items includes analyzing text and image content of the digital content items.

14. The method of claim 8, wherein identifying the one or more additional items of clothing or apparel is further based on a demographic user category, and recommendations to others having similar categories of interest.

15. One or more non-transitory computer readable media containing instructions that when executed by a processor cause one or more computers to perform operations comprising:

monitoring one or more digital content items that depict clothing or apparel to detect user inputs associated with presentation of the one or more digital content items in one or images by a terminal component for display;

responsive to user input associated with the one or more digital content items:

analyzing a content tag associated with the one or more images describing a first item of clothing or apparel displayed in the first image, wherein the content tag includes information identifying a plurality of visual characteristics of the first item of clothing or apparel;

determining one or more recommendation parameters for the user based at least in part on at least one of the plurality of visual characteristics and user specific information stored in a user profile associated with a user; and identifying one or more additional items of clothing or apparel based at least in part on the one or more recommendation parameters; and providing for display by the terminal component one or more additional digital content items corresponding to the one or more additional items of clothing or apparel as a recommendation for the user, wherein the one or more additional items of clothing or apparel are rendered by the terminal component using a photorealistic interface that presents the one or more additional items of clothing or apparel in a manner that reflects how the one or more additional items of clothing or apparel would appear when worn on a person.

16. The one or more non-transitory computer readable media of claim 15, wherein identifying the one or more additional items of clothing or apparel further comprises: (i) identifying other users that have interest in a product categorization that is of interest to the user, and (ii) determining what items of clothing or apparel were purchased or of interest to the other users.

17. The one or more non-transitory computer readable media of claim 16, wherein identifying other users is based on a categorization of the user corresponding to a taste or preference for the product categorization.

18. The one or more non-transitory computer readable media of claim 17, wherein determining the taste of the user includes programmatically determining visual characteristics of items or clothing or apparel that are of interest to the user.

* * * * *